(12) United States Patent
Kaburagi (10) Patent No.: US 11,511,537 B2
(45) Date of Patent: Nov. 29, 2022

(54) INKJET IMAGE FORMING APPARATUS AND IMAGE FORMING CONDITION CHANGING METHOD

(71) Applicant: Konica Minolta, Inc., Tokyo (JP)

(72) Inventor: Mitsuo Kaburagi, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 99 days.

(21) Appl. No.: 16/918,247

(22) Filed: Jul. 1, 2020

(65) Prior Publication Data

US 2021/0001623 A1  Jan. 7, 2021

(30) Foreign Application Priority Data

Jul. 1, 2019 (JP) .............................. JP2019-122958

(51) Int. Cl.
*B41J 2/005* (2006.01)
*B41J 2/14* (2006.01)
*B41J 2/01* (2006.01)

(52) U.S. Cl.
CPC ............... *B41J 2/0057* (2013.01); *B41J 2/14* (2013.01); *B41J 2002/012* (2013.01)

(58) Field of Classification Search
CPC ...... B41J 2/0057; B41J 2/14; B41J 2002/012; B41J 2/04558; B41J 2/04581; B41J 2/2135; B41J 2/01; G06K 15/027

USPC ............................................................ 347/9
See application file for complete search history.

(56) References Cited

U.S. PATENT DOCUMENTS

| | | | | |
|---|---|---|---|---|
| 2005/0062774 A1* | 3/2005 | Kusunoki | ............ | B41J 2/04581 347/9 |
| 2010/0053287 A1* | 3/2010 | Belelie | ................. | B41M 7/0081 347/100 |
| 2014/0168312 A1* | 6/2014 | Mizes | ................... | B41J 2/04586 347/17 |
| 2017/0072708 A1* | 3/2017 | Miyashita | .......... | B41J 11/00244 |

FOREIGN PATENT DOCUMENTS

JP     2012096546 A     5/2012

* cited by examiner

*Primary Examiner* — Kristal Feggins
*Assistant Examiner* — Alexander D Shenderov
(74) *Attorney, Agent, or Firm* — Cantor Colburn LLP (57) ABSTRACT

An inkjet image forming apparatus includes: an image former that forms an image on a transfer body by discharging an ink droplet from an inkjet head; and a hardware processor that detects a landing state of the ink droplet that has been discharged and landed on the transfer body and changes an image forming condition when the image is formed so that a detected landing state approaches a target landing state.

11 Claims, 6 Drawing Sheets

INKJET IMAGE FORMING APPARATUS AND IMAGE FORMING CONDITION CHANGING METHOD

The present invention claims priority under 35 U.S.C. § 119 to Japanese Application No. 2019-122958 filed Jul. 1, 2019, the entire content of which is incorporated herein by reference.

BACKGROUND

Technological Field

The present invention relates to an inkjet image forming apparatus and an image forming condition changing method.

Description of the Related Art

In recent years, as an apparatus that records a high-definition image on various recording media such as paper and cloth, an image forming apparatus by an inkjet method of forming an image on a recording medium by discharging an ink droplet from an inkjet head (hereinafter, referred to as an "inkjet image forming apparatus") is widely used.

In an inkjet image forming apparatus, there is proposed an intermediate transfer type in which an ink droplet discharged from an inkjet head is formed as an image on an intermediate transfer body such as an intermediate transfer belt, and the formed image is transferred to a recording medium at a transfer nip (for example, see P 2012-96546 A). With this intermediate transfer type, an amount of the ink droplet can be suppressed in advance, and the ink droplet can be crushed by the transfer pressure of the transfer nip and expanded to a desired size (diameter). In other words, an image with high image coverage can be formed with a small amount of the ink droplet.

An inkjet image forming apparatus of an intermediate transfer type has, for example, a configuration using ink that is cured (thickened) by an active energy ray (for example, an ultraviolet ray) and using a transfer body having active energy ray transmissivity in order to ensure the transferability of an image to a recording medium. In this configuration, an image (ink droplet) clamped and pressed (nipped) at a transfer nip is irradiated with an active energy ray to adjust the viscosity of the ink droplet.

Incidentally, in a case where the surface energy of the ink used for image formation is low (that is, the viscosity is high), the temperature of a position where the ink droplet has landed on the intermediate transfer body is different from target temperature, and as a result, a deviation in a spread (diameter) of the ink droplet occurs. In addition, in a case where unevenness in a moving speed of the intermediate transfer body on which an image is formed occurs, a deviation occurs between the position where the ink droplet has landed on the intermediate transfer body and a target landing position. There is a problem that when these deviations occur, the quality of the image formed on the intermediate transfer body deteriorates, and then the quality of the image finally transferred to the recording medium at the transfer nip deteriorates.

SUMMARY

An object of the present invention is to provide an inkjet image forming apparatus and an image forming condition changing method capable of suppressing deterioration in the quality of an image formed on a transfer body.

To achieve the abovementioned object, according to an aspect of the present invention, an inkjet image forming apparatus reflecting one aspect of the present invention comprises: an image former that forms an image on a transfer body by discharging an ink droplet from an inkjet head; and a hardware processor that detects a landing state of the ink droplet that has been discharged and landed on the transfer body and changes an image forming condition when the image is formed so that a detected landing state approaches a target landing state.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
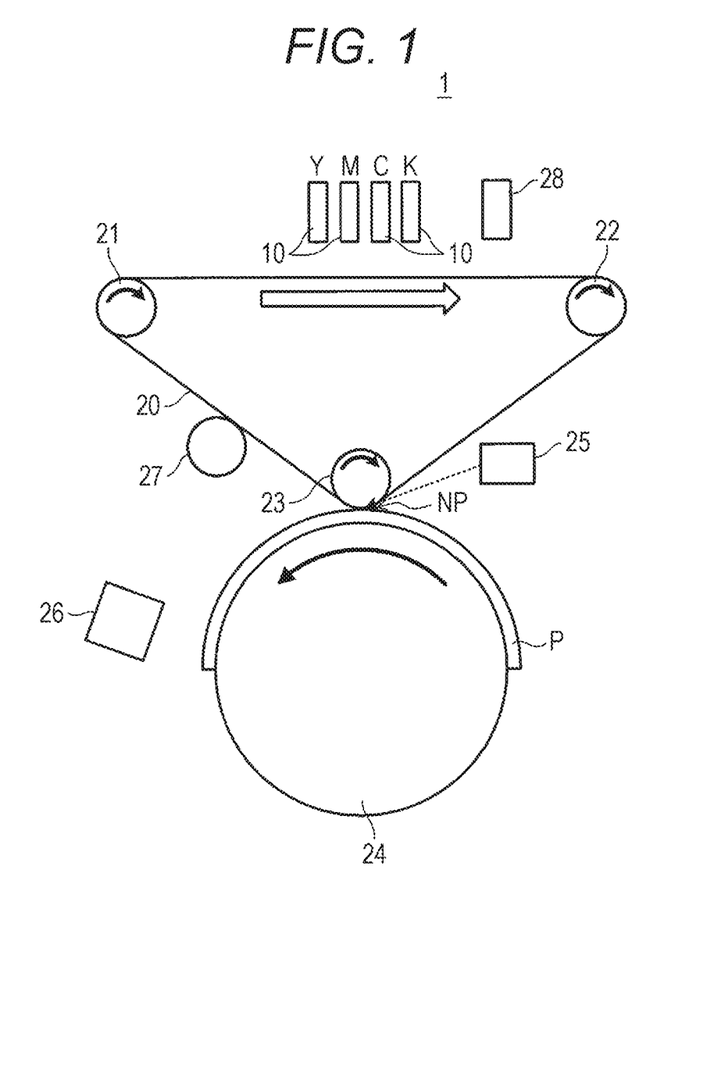
FIG. 1 is a diagram schematically showing an overall configuration of an inkjet image forming apparatus.

Hereinafter, one or more embodiments of an inkjet image forming apparatus 1 of the present invention will be described with reference to the drawings. However, the scope of the invention is not limited to the disclosed embodiments. FIG. 1 is a diagram schematically showing an overall configuration of the inkjet image forming apparatus 1 according to the present embodiment. In addition, FIG. 2 is a block diagram showing a main functional configuration of the inkjet image forming apparatus 1.

Figure 2:
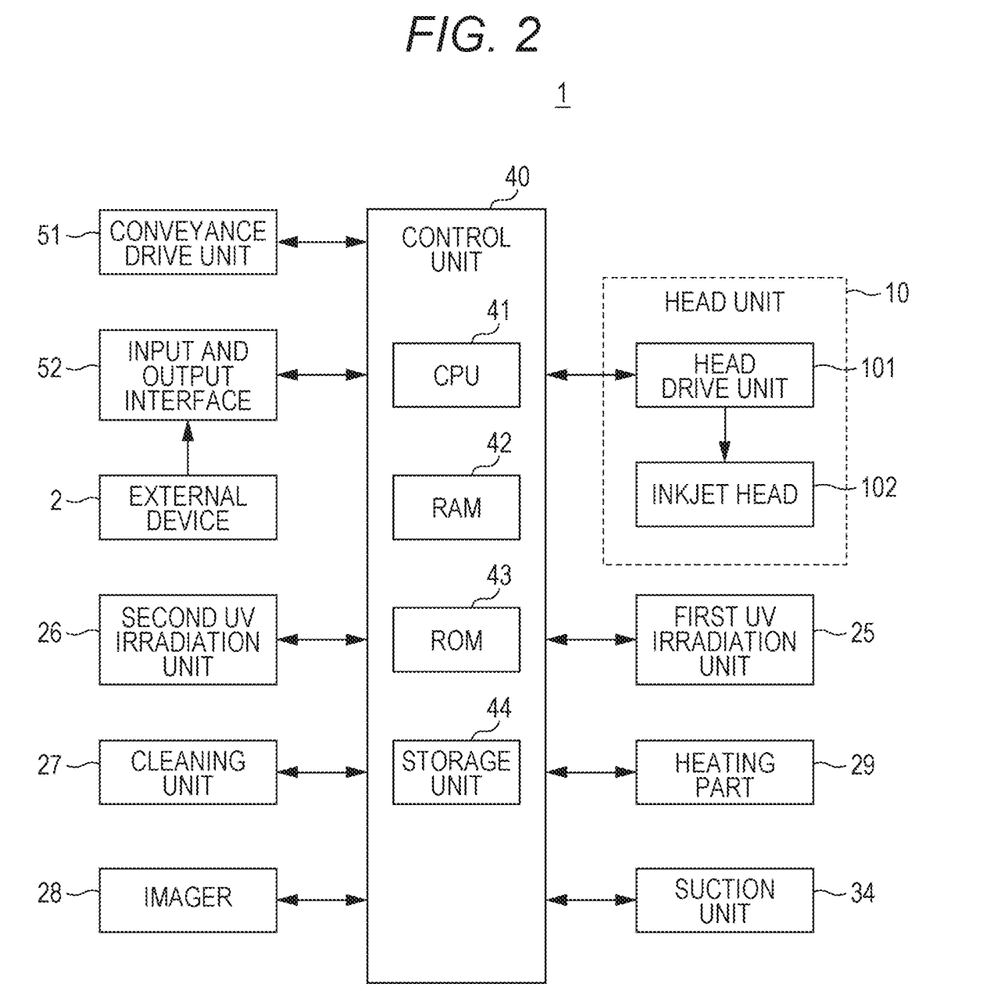
FIG. 2 is a block diagram showing a main functional configuration of the inkjet image forming apparatus.

As shown in FIG. 1, the inkjet image forming apparatus 1 includes a head unit 10, a transfer belt 20, driven rollers 21 and 22, a transfer roller 23 as a drive roller, a conveyance drum 24, and a control unit 40 (see FIG. 2). The head unit 10 includes an inkjet head 102 (see FIG. 2) that is mounted thereon and functions as an "image former" of the present invention. The transfer belt 20 functions as a "transfer body" of the present invention. The driven rollers 21 and 22 and the transfer roller 23 rotatably stretch the transfer belt 20. The conveyance drum 24 conveys a recording medium P. The control unit 40 controls the whole of the inkjet image forming apparatus 1. Note that the control unit 40 functions as a "landing state detector" and an "image forming condition changer" of the present invention.

In addition, the inkjet image forming apparatus 1 includes a first ultraviolet (UV) irradiation unit 25, a second UV irradiation unit 26, a cleaning unit 27, and a conveyance drive unit 51. The first ultraviolet (UV) irradiation unit 25 adjusts the viscosity of the ink droplet discharged to the transfer belt 20. The second UV irradiation unit 26 cures ink transferred to the recording medium P. The cleaning unit 27 cleans a surface of the transfer belt 20. The conveyance drive unit 51 drives the transfer roller 23 and the conveyance drum 24.

Note that although not shown, the inkjet image forming apparatus 1 includes a feeding unit, an ejecting unit, a display unit, and the like. The feeding unit loads the recording medium P and feed the recording medium P to the conveyance drum 24. The ejecting unit ejects the recording medium P on which the image has been transferred to a downstream side in a conveyance direction of the conveyance drum 24. The display unit displays a state of the inkjet image forming apparatus 1. Since these are publicly known configurations, illustration and description thereof are omitted. In addition, as the recording medium P, in addition to paper such as plain paper or coated paper, various media to which the ink droplet that have landed on the surface of the transfer belt 20 can be transferred such as cloth and sheet-shaped resin can be used.

The transfer belt 20 is stretched over the driven rollers 21 and 22 arranged above and a transfer roller 23 (drive roller) arranged below. The driving force of a transfer motor (not shown) of the conveyance drive unit 51 is transmitted to the transfer roller 23, whereby the transfer roller 23 rotates (moves) clockwise in FIG. 1.

In the present embodiment, a heating source (for example, a heater) is provided in the driven roller 22. The temperature of the heating source is controlled by the control unit 40. The driven roller 22 is heated by the heating source, and as a result, the transfer belt 20 is heated so that the temperature of the transfer belt 20 reaches target temperature. The target temperature is temperature set so that a diameter of the ink droplet discharged on the transfer belt 20 becomes a predetermined diameter.

In the present embodiment, as the transfer belt 20, there is used an endless belt that has active energy ray transmissivity and in which an elastic layer of silicon rubber, a reflective layer in which aluminum (Al) is deposited, and a surface layer of polypropylene (PP) are laminated on a polyimide (PI) base. In addition, as the transfer roller 23, for example, a rubber roller having a diameter of 100 mm and a surface rubber thickness of 10 mm is used. Note that as for a base material, a resin material such as polyimide (PI) may be used, or a stainless material may be used.

In the inkjet image forming apparatus 1, the above-described transfer motor is driven on the basis of a control signal of the control unit 40 and the transfer roller 23 is rotated clockwise in FIG. 1, whereby the transfer belt 20 is rotated clockwise. In the present embodiment, a rotation speed of the transfer roller 23 is controlled under the control of the control unit 40 so that the transfer belt 20 rotates at a speed of 600 mm/sec (printing speed).

The conveyance drum 24 rotates around a rotation axis extending in a direction perpendicular to the drawing of FIG. 1 (hereinafter, referred to as an "orthogonal direction") while holding the recording medium P on a cylindrical outer peripheral curved surface (conveyance surface), whereby the recording medium P is conveyed in the conveyance direction along the conveyance surface.

Specifically, the conveyance drum 24 includes a conveyance drum motor (not shown) and rotates counterclockwise in FIG. 1 by the conveyance drum motor being driven under the control of the control unit 40. In the present embodiment, a metal drum having a large size (for example, a triple-size cylinder for a printing machine) is used as the conveyance drum 24.

The transfer belt 20 and the conveyance drum 24 described above have a width, that is, an axial length of 800 mm.

The transfer roller 23 is arranged to face an upper portion of the conveyance drum 24 and presses the conveyance drum 24 via the transfer belt 20. In addition, the conveyance drum 24 is pressed against the transfer roller 23 with the transfer belt 20 interposed therebetween, whereby a transfer nip NP transfers an image from the transfer belt 20 to the recording medium P is formed. In the present embodiment, a value of transfer load or contact pressure (hereinafter, referred to as "transfer pressure") at the transfer nip NP is set to 80 N.

The head unit 10 forms an image on the transfer belt 20 by discharging the ink droplet to the transfer belt 20 from a nozzle opening part provided on an ink discharge surface facing the transfer belt 20. The conveyance drum 24 conveys the recording medium P so that the image formed on the transfer belt 20 is transferred to a predetermined position on the recording medium P by the transfer nip NP.

In the inkjet image forming apparatus 1 according to the present embodiment, four head units 10 corresponding to ink of four colors of yellow (Y), magenta (M), cyan (C), and black (K) are arranged so as to be arranged at predetermined intervals in the order of Y, M, C, and K colors from an upstream side in a rotation direction (moving direction) of the transfer belt 20.

Each head unit 10 includes the inkjet head 102 (see FIG. 2). The inkjet head 102 is provided with a plurality of recording elements each having a pressure chamber that stores the ink, a piezoelectric element provided on a wall surface of the pressure chamber, and a nozzle. When a drive signal that deforms the piezoelectric element is input in the recording element, the pressure chamber is deformed by the deformation of the piezoelectric element, pressure in the pressure chamber changes, and the ink droplet is discharged from the nozzle communicating with the pressure chamber.

An arrangement range in an orthogonal direction of the nozzle included in the inkjet head 102 covers a width in an orthogonal direction of a region of the recording medium P conveyed by the conveyance drum 24 where an image is formed. The head unit 10 is used while the position thereof is fixed with respect to the rotation axis of the conveyance drum 24 during image formation. That is, the inkjet image forming apparatus 1 is a single-pass type inkjet image forming apparatus.

In the present embodiment, as the ink discharged from the inkjet head 102 to the transfer belt 20, ink having ultraviolet curability that the ink is cured by being irradiated with an ultraviolet ray is used. More specifically, ink whose viscosity changes in accordance with a light amount of an active energy ray supplied to the transfer belt 20 (a light amount of an ultraviolet (UV) ray output from the first UV irradiation unit 25) is used. Ink having a property that the viscosity thereof increases as a light amount of an active energy ray emitted from the first UV irradiation unit 25 increases is used. That is, the image former of the inkjet image forming apparatus 1 employs a UV curable inkjet method.

The first UV irradiation unit 25 is arranged on the surface side of the transfer belt 20, and when the ink droplet discharged on the transfer belt 20 is clamped and pressed (nipped) at the transfer nip NP under the control of the control unit 40, the first UV irradiation unit 25 irradiates the ink droplet with an active energy ray to cure the ink droplet.

In FIG. 1, a dotted line arrow extending from the first UV irradiation unit 25 shows the active energy ray emitted from the surface side of the transfer belt 20 to the ink droplet discharged to the transfer belt 20. In the present embodiment, the first UV irradiation unit 25 includes a UV light source that outputs UV light having a wavelength of 395 nm, and the default value of irradiation intensity in a normal print job is set to 5 mW/cm$^2$.

The second UV irradiation unit 26 is arranged so as to irradiate the recording medium P conveyed on a downstream side of the transfer nip NP with an active energy ray, and the image (ink droplet) transferred by the transfer nip NP is fully cured under the control of the control unit 40. In the present embodiment, the second UV irradiation unit 26 includes a UV light source that outputs UV light having a wavelength of 395 nm, and the default value of irradiation intensity in a normal print job is set to 10 mW/cm$^2$.

The cleaning unit 27 includes a dry web (web roller) that is arranged to face the surface of the transfer belt 20 between the driven roller 21 and the transfer roller 23 (drive roller) in the moving direction (rotation direction) of the transfer belt 20. The dry web cleans the surface of the transfer belt 20.

The dry web of the cleaning unit 27 is contactable with and separable from the transfer belt 20 and be rotatable with respect to the transfer belt 20. The dry web rotates while contacting the transfer belt 20 under the control of the control unit 40, whereby the dry web cleans the surface of transfer belt 20 to remove foreign matters (unnecessary ink and paper dust due to transfer residue and mist) attached to the surface.

Next, with reference mainly to FIG. 2, other main functional configurations of the inkjet image forming apparatus 1 will be described. The inkjet image forming apparatus 1 includes a head drive unit 101 and the inkjet head 102 that are included in the head unit 10, the control unit 40, the conveyance drive unit 51, and an input and output interface 52.

The head drive unit 101 outputs a drive signal that deforms the piezoelectric element in accordance with image data at appropriate timing to the recording element of the inkjet head 102 on the basis of the control of the control unit 40, whereby an amount of the ink droplet corresponding to a pixel value of the image data is discharged from the nozzle of the inkjet head 102.

The control unit 40 includes a central processing unit (CPU) 41, a random access memory (RAM) 42, a read only memory (ROM) 43, and a storage unit 44.

The CPU 41 reads various control programs (for example, an image forming condition changing program) and setting data stored in the ROM 43 and cause the RAM 42 to store the various control programs and the setting data, and execute the programs to perform various arithmetic processing. In addition, the CPU 41 controls an overall operation of the inkjet image forming apparatus 1.

The RAM 42 provides the CPU 41 with a working memory space to and store temporary data. Note that the RAM 42 may include a nonvolatile memory.

The ROM 43 stores the various control programs executed by the CPU 41, the setting data, and the like. Note that instead of the ROM 43, a rewritable nonvolatile memory such as an electrically erasable programmable read only memory (EEPROM) or a flash memory may be used.

The storage unit 44 stores a print job (specifically, an image forming instruction including various user setting information such as the number of print sheets) and image data related to the print job input from an external device 2 via the input and output interface 52. As the storage unit 44, for example, a hard disk drive (HDD) is used, and a dynamic random access memory (DRAM) or the like may be used in combination therewith.

The conveyance drive unit 51 supplies a drive signal to the conveyance drum motor of the conveyance drum 24 on the basis of a control signal supplied from the control unit 40 to rotate the conveyance drum 24 at a predetermined speed and timing. In addition, the conveyance drive unit 51 supplies a drive signal to a motor of the transfer roller 23 on the basis of a control signal supplied from the control unit 40 to rotate the transfer belt 20 at a predetermined speed and timing.

The input and output interface 52 is configured mediate data transmission and reception between the external device 2 and the control unit 40. The input and output interface 52 includes, for example, any of various serial interfaces and various parallel interfaces, or a combination thereof.

The external device 2 is, for example, a personal computer and supplies the print job, the image data, and the like to the control unit 40 via the input and output interface 52.

Incidentally, in a case where the surface energy of the ink used for image formation is low (that is, the viscosity is high), the temperature of the position where the ink droplet has landed on the transfer belt 20 is different from the target temperature, and as a result, a deviation in the spread (diameter) of the ink droplet occurs. In particular, since the ink used for image formation has ultraviolet curability, the link tends to be affected by temperature immediately after landing, and the diameter of the ink droplet tends to change in accordance with the temperature. In addition, in a case where unevenness in the moving speed of the transfer belt 20 on which the image is formed occurs, a deviation occurs between the position where the ink droplet that has landed on the transfer belt 20 and a target landing position. There is a problem that when these deviations occur, the quality of the image formed on the transfer belt 20 deteriorates, and then the quality of the image finally transferred to the recording medium P by the transfer nip NP deteriorates.

Therefore, in the present embodiment, the inkjet image forming apparatus 1 further includes an imager 28, a heating part 29, and a suction unit 34.

The imager 28 includes, for example, a charge coupled device (CCD) sensor or a complementary metal oxide semiconductor (CMOS) sensor, and is arranged between the head unit 10 and the driven roller 22 in the moving direction of the transfer belt 20 (see FIG. 1).

The imager 28 images the ink droplet that has been discharged from the inkjet head 102 and landed on the transfer belt 20 at timing other than the time of normal image formation at which an image is formed on the recording medium P (for example, timing of executing an image forming condition changing mode) for each color (yellow (Y), magenta (M), cyan (C), and black (K)) of the image formed on the transfer belt 20. Note that the imager 28 is arranged so as to be able to image a range equal to or slightly larger than the maximum width of an image that can be formed by the head unit 10.

Figure 3:
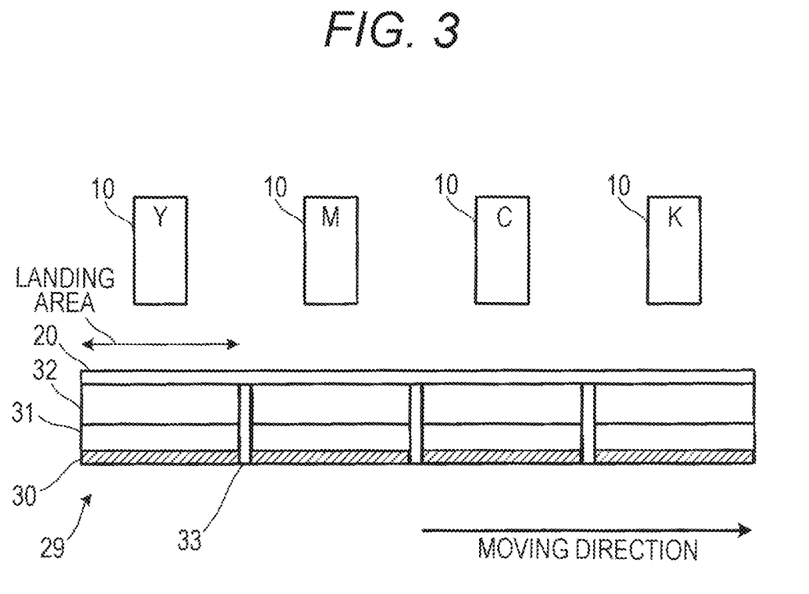
FIG. 3 is a diagram showing a configuration of a heating part.

The heating part 29 is provided to face the head unit 10 for each color (yellow (Y), magenta (M), cyan (C), black (K)) of the image formed on the transfer belt 20 and heats a landing area of the ink droplet on the transfer belt 20. FIG. 3 is a diagram showing a configuration of the heating part 29. Note that since the heating part 29 provided to face the head unit 10 of each color has a similar configuration, the following description will focus on the configuration of the heating part 29 provided to face the head unit 10 of the yellow (Y) color.

As shown in FIG. 3, the heating part 29 is arranged on a back surface side of the transfer belt 20, and has a structure in which a heater 30, an aluminum plate 31, and a porous material 32 are sequentially laminated in that order from below.

The heater 30 receives, from the control unit 40, the target temperature (control signal) set for heating the landing area of the ink droplet, and heat the landing area of the ink droplet on the transfer belt 20 from the back surface side of the transfer belt 20 via the aluminum plate 31 and the porous material 32. Note that from the viewpoint of improving temperature responsiveness to heating by the heater 30, the thickness of the transfer belt 20 is preferably within 0.1 to 0.6 mm.

In the present embodiment, in order to directly or indirectly detect the temperature of the transfer belt 20, a temperature sensor (for example, a thermistor) (not shown) is provided on the transfer belt 20 or in the aluminum plate 31, and feedback control of the heater 30 is performed on the basis of temperature detected by the temperature sensor. That is, temperature adjustment control that adjusts the temperature of the transfer belt 20 to the target temperature is performed.

A plurality of heating parts 29 provided for each color of the image formed on the transfer belt 20 is arranged while being partitioned by a heat insulating plate 33. With this configuration, it is possible to prevent heat generated by heating by the heater 30 from being directly conducted to the heating part 29 of an adjacent color, and then it is possible to control the temperature of the landing area by heating the landing area of the ink droplet on the transfer belt 20 for each color of the image. Note that from the viewpoint of more effectively preventing the heat generated by heating by the heater 30 from being conducted to the heating part 29 of the adjacent color, a heat insulating film may be provided on a surface (side surface) of the heat insulating plate 33.

In addition, in response to receiving the control of the control unit 40, the heater 30 heats the landing area of the ink droplet so that the temperature of the landing area becomes uniform in an orthogonal direction (width direction) orthogonal to the moving direction of the transfer belt 20. In particular, since temperature at an end portion side tends to be lower than temperature on a center portion side in the orthogonal direction orthogonal to the moving direction of the transfer belt 20, the heater 30 heats the end portion side at heating temperature higher than that of the center portion side. For example, the heater 30 is divided into a plurality of heating areas in the orthogonal direction orthogonal to the moving direction of the transfer belt 20 and heats a heating area on the end portion side at higher heating temperature than that of a heating area on the center portion side.

The aluminum plate 31 is provided for diffusing the heat supplied from the heater 30 in the moving direction of the transfer belt 20 and uniformly transmitting the heat to the porous material 32.

The porous material 32 is a porous material and has a foamed structure. Under the control of the control unit 40, the suction unit 34 (see FIG. 2) suctions the transfer belt 20 from the back surface side of the transfer belt 20 with a predetermined suction force and cause the transfer belt 20 adhere to the porous material 32. As a result, since the transfer belt 20 is supported in close contact with the porous material 32, an image forming surface on which the image is formed on the transfer belt 20 is smoothed. With this configuration, the quality of the image formed on the transfer belt 20 can be improved. Note that the porous material 32 and the suction unit 34 function as a "smoother" of the present invention.

In addition, since the porous material 32 has a heat insulating structure, the heat supplied from the heater 30 can be diffused by the porous material 32 in the moving direction of the transfer belt 20, and the landing area of the ink droplet can be uniformly heated. As described above, since the heating part 29 has a structure in which the heater 30, the aluminum plate 31, and the porous material 32 are laminated, it is possible to uniformly heat the landing area of the ink droplet as compared with a configuration in which the heater 30 directly heats the transfer belt 20 (that is, a configuration in which there is a possibility that unevenness in heating may occur).

The control unit 40 detects a landing state of the ink droplet (dot) immediately after the ink droplet has been discharged from the inkjet head 102 and landed on the transfer belt 20 on the basis of an imaging result of the imager 28 for each color (yellow (Y), magenta (M), cyan (C), black (K)) of the image formed on the transfer belt 20. Then, the control unit 40 changes an image forming condition when the image is formed so that the detected landing state approaches a target landing state.

Specifically, the control unit 40 detects, as a landing state, the diameter of the ink droplet that has been discharged from the inkjet head 102 and landed on the transfer belt 20 and change heating temperature of the heating part 29 (image forming condition) so that the detected diameter approaches a target diameter (landing state).

For example, in a case where the diameter of the ink droplet that has landed on the transfer belt 20 is smaller than the target diameter, the control unit 40 increases the heating temperature of the heating part 29. Meanwhile, in a case where the diameter of the ink droplet that has landed on the transfer belt 20 is larger than the target diameter, the control unit 40 decreases the heating temperature of the heating part 29. This is because as the heating temperature of the heating part 29 increases, the diameter of the ink droplet that has landed on the transfer belt 20 increases (spreads).

In addition, the control unit 40 detects, as a landing state, a landing position of the ink droplet that has been discharged from the inkjet head 102 and landed on the transfer belt 20 and change timing of discharging the ink droplet from the inkjet head 102 (image forming condition) so that the detected landing position approaches a target landing position (landing state).

For example, in a case where the landing position of the ink droplet that has landed on the transfer belt 20 is an upstream side from the target landing position in the moving direction of the transfer belt 20, the control unit 40 advances the timing of discharging the ink droplet from the inkjet head 102. Meanwhile, in a case where the landing position of the ink droplet that has landed on the transfer belt 20 in the moving direction of the transfer belt 20 is a downstream side from the target landing position, the control unit 40 delays the timing of discharging the ink droplet from the inkjet head 102. Note that the control unit 40 acquires an encoder pulse signal indicating the number of rotations of the transfer belt 20, and in a case where the number of rotations reaches a predetermined number of rotations, the control unit 40 causes the inkjet head 102 to discharge the ink droplet. Therefore, in a case where the control unit 40 changes the timing of discharging the ink droplet from the inkjet head 102, the control unit 40 changes the predetermined number of rotations that indicates timing at which the ink droplet is discharged.

Figure 4:
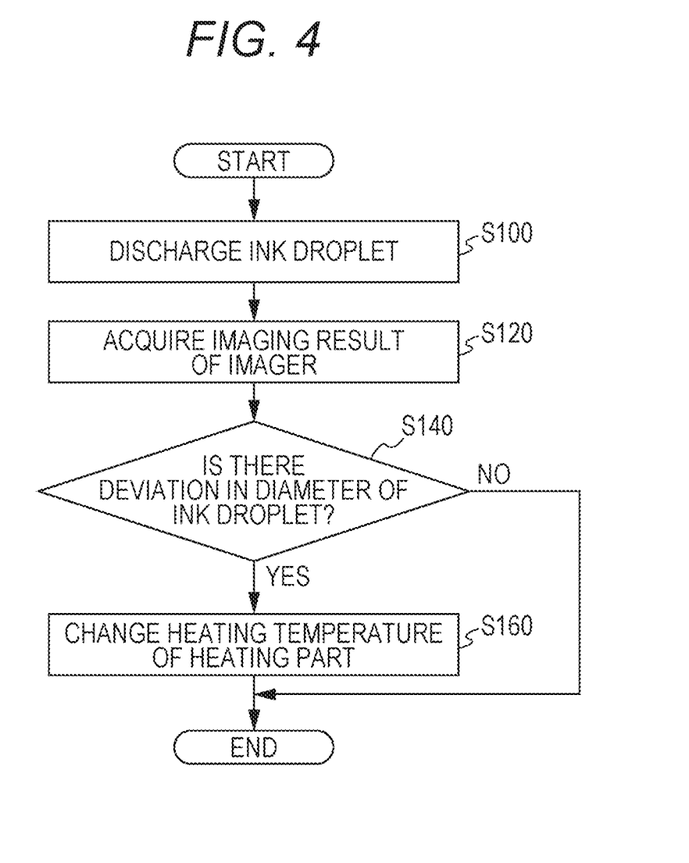
FIG. 4 is a flowchart showing an example of an image forming condition changing operation of the inkjet image forming apparatus.

Next, with reference to FIG. 4, an example of an image forming condition changing operation of the inkjet image forming apparatus 1 will be described. Note that processing shown in FIG. 4 is executed at timing other than the time of normal image formation at which an image is formed on the recording medium P (for example, timing of executing an image forming condition changing mode) for each color (yellow (Y), magenta (M), cyan (C), and black (K)) of the image formed on the transfer belt 20.

First, the control unit 40 controls the head unit 10 to discharge the ink droplet from the inkjet head 102 (step S100). Next, the control unit 40 acquires an imaging result of the imager 28 regarding the ink droplet discharged in step S100 (step S120).

Next, the control unit 40 refers to the imaging result and determine whether there is a deviation between the diameter of the ink droplet that has been discharged from the inkjet head 102 and landed on the transfer belt 20 and the target diameter (step S140). As a result of the determination, in a case where there is no deviation (step S140, NO), the inkjet image forming apparatus 1 ends the processing in FIG. 4.

Meanwhile, in a case where there is a deviation (step S140, YES), the control unit 40 changes the heating temperature of the heating part 29 so that the diameter of the ink droplet that has landed on the transfer belt 20 approaches the target diameter (step S160). Thereafter, the inkjet image forming apparatus 1 ends the processing in FIG. 4.

Figure 5:
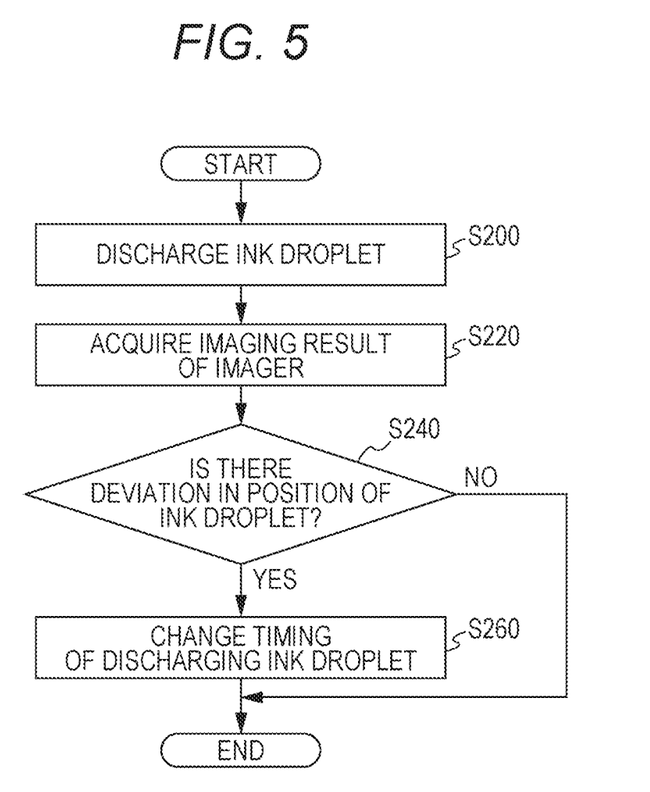
FIG. 5 is a flowchart showing an example of the image forming condition changing operation of the inkjet image forming apparatus.

Next, with reference to FIG. 5, an example of the image forming condition changing operation of the inkjet image forming apparatus 1 will be described. Note that processing shown in FIG. 5 is executed at timing other than the time of normal image formation at which an image is formed on the recording medium P (for example, timing of executing an image forming condition changing mode) for each color (yellow (Y), magenta (M), cyan (C), and black (K)) of the image formed on the transfer belt 20.

First, the control unit 40 controls the head unit 10 to discharge the ink droplet from the inkjet head 102 (step S200). Next, the control unit 40 acquires an imaging result of the imager 28 regarding the ink droplet discharged in step S200 (step S220).

Next, the control unit 40 refers to the imaging result and determine whether there is a deviation between the landing position of the ink droplet that has been discharged from the inkjet head 102 and landed on the transfer belt 20 and the target landing position (step S240). As a result of the determination, in a case where there is no deviation (step S140, NO), the inkjet image forming apparatus 1 ends the processing in FIG. 5.

Meanwhile, in a case where there is a deviation (step S240, YES), the control unit 40 changes the timing of discharging the ink droplet from the inkjet head 102 so that the landing position of the ink droplet that has landed on the transfer belt 20 approaches the target landing position (step S260). Thereafter, the inkjet image forming apparatus 1 ends the processing in FIG. 5.

As described above in detail, in the present embodiment, the inkjet image forming apparatus 1 includes the head unit 10 (image former), the control unit 40 (landing state detector), and the control unit 40 (image forming condition changer). The head unit 10 discharges the ink droplet from the inkjet head 102 to form the image on the transfer belt 20 (transfer body). The control unit 40 detects the landing state of the ink droplet that has been discharged and landed on the transfer belt 20. The control unit 40 changes the image forming conditions when the image is formed so that the detected landing state approaches the target landing state.

According to the present embodiment configured as described above, even in a case where there occurs a deviation in the spread (diameter) of the ink droplet that has landed on the transfer belt 20 or in a case where unevenness in the moving speed of the transfer belt 20 on which the image is formed occurs, the landing state (diameter and landing position) of the ink droplet that has landed on the transfer belt 20 is detected, and the image forming condition (heating temperature and timing of discharging) is changed so that the detected landing state approaches the target landing state. Therefore, it is possible to suppress the deterioration of the quality of the image formed on the transfer belt 20, and then it is possible to suppress the deterioration of the quality of the image finally transferred to the recording medium P by the transfer nip NP.

In addition, in the present embodiment, the imager 28 images the ink droplet that has landed on the transfer belt 20 for each color of the image formed on the transfer belt 20, and the control unit 40 detects the landing state of the ink droplet for each color of the image on the basis of the imaging result of the imager 28. With this configuration, the image forming condition can be changed so that the landing state of the ink droplet that has landed on the transfer belt 20 approaches the target landing state for each color of the image formed on the transfer belt 20.

Figure 6:
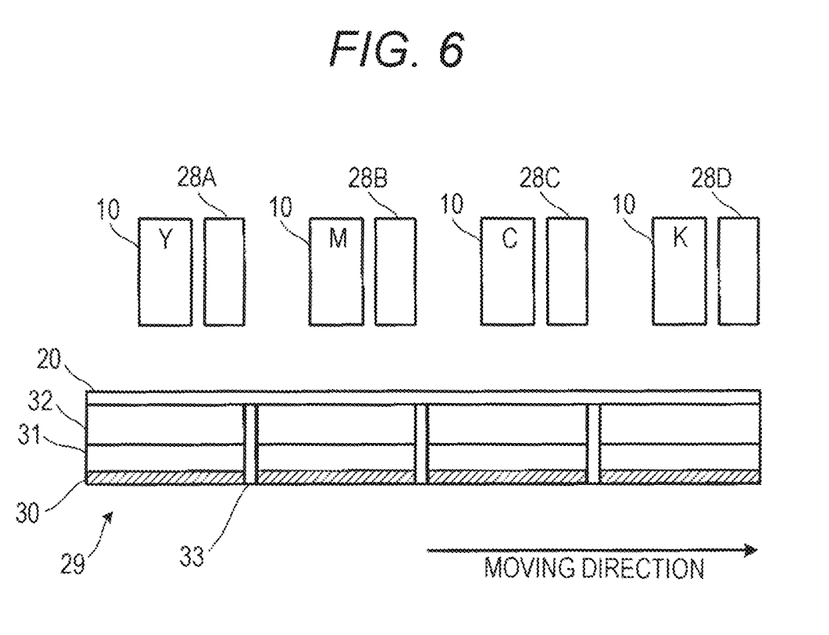
FIG. 6 is a diagram showing a modification example of a configuration of an imager.

Note that in the above-described embodiment, there has been described an example in which the imager 28 images the ink droplet that has landed on the transfer belt 20 for each color of the image formed on the transfer belt 20, but the present invention is not limited to this. For example, as shown in FIG. 6, a plurality of imagers 28A to 28D may be provided. The plurality of imagers 28A to 28D images the ink droplet that has landed on the transfer belt 20 may be provided for each color of the image formed on the transfer belt 20.

In addition, in the above-described embodiment, there has been described an example in which the control unit 40 changes the heating temperature of the heating part 29 so that the diameter of the ink droplet that has landed on the transfer belt 20 approaches the target diameter, but the present invention is not limited to this. For example, the control unit 40 may control a discharge voltage value of the inkjet head 102 and change an amount of discharging the ink droplet from the inkjet head 102 so that the diameter of the ink droplet that has landed on the transfer belt 20 approaches the target diameter. For example, in a case where the diameter of the ink droplet that has landed on the transfer belt 20 is smaller than the target diameter, the control unit 40 increases the amount of discharging the ink droplet from the inkjet head 102. Meanwhile, in a case where the diameter of the ink droplet that has landed on the transfer belt 20 is larger than the target diameter, the control unit 40 decreases the amount of discharging the ink droplet from the inkjet head 102.

In addition, in the above-described embodiment, there has been described an example in which the active energy ray emitted by the first UV irradiation unit 25 is an ultraviolet ray, but the present invention is not limited to this. For example, the active energy ray may be an electron ray. In this case, it is preferable to use ink whose viscosity changes in accordance with the electron ray.

In addition, in the above-described embodiment, there has been described an example in which the cleaning unit 27 includes the dry web (web roller) that cleans the surface of the transfer belt 20, but the present invention is not limited to this. For example, the cleaning unit 27 may include a sponge roller, a cleaning brush or a cleaning blade, and the like that clean the surface of the transfer belt 20.

Although embodiments of the present invention have been described and illustrated in detail, the disclosed embodiments are made for purposes of illustration and example only and not limitation. The scope of the present invention should be interpreted by terms of the appended claims. That is, the present invention can be implemented in various forms, without departing from the gist or the main features thereof.

What is claimed is:

1. An inkjet image forming apparatus comprising:
    an image former that forms an image on a transfer body by discharging an ink droplet from an inkjet head;
    a hardware processor that detects a landing state of the ink droplet that has been discharged and landed on the transfer body and changes an image forming condition when the image is formed so that a detected landing state approaches a target landing state; and
    a heating part that heats a landing area of the ink droplet on the transfer body,
    wherein the detected landing state is a diameter of the ink droplet,
    the landing state includes a diameter of the ink droplet,
    the hardware processor changes heating temperature of the heating part as the image forming condition, and
    the heating part is arranged on a back surface side of the transfer body and has a structure in which a heater, an aluminum plate, and a porous material are sequentially laminated in that order from below.

2. The inkjet image forming apparatus according to claim 1, further comprising
    an imager that images the ink droplet that has landed on the transfer body,
    wherein the hardware processor detects the landing state of the ink droplet on the basis of an imaging result of the imager.

3. The inkjet image forming apparatus according to claim 2, wherein
    the imager images the ink droplet that has landed on the transfer body for each color of the image formed on the transfer body, and
    the hardware processor detects the landing state of the ink droplet for each color of the image on the basis of the imaging result of the imager.

4. The inkjet image forming apparatus according to claim 1, further comprising a plurality of imagers that image the ink droplet landed on the transfer body for each color of the image formed on the transfer body,
    wherein the hardware processor detects the landing state of the ink droplet for each color of the image on the basis of imaging results of the plurality of imagers.

5. The inkjet image forming apparatus according to claim 1, wherein
    the heating part heats the landing area of the ink droplet so that the temperature of the landing area becomes uniform in an orthogonal direction orthogonal to a moving direction of the transfer body.

6. The inkjet image forming apparatus according to claim 1, further comprising
    a plurality of heating parts that heats the landing area of the ink droplet on the transfer body for each color of the image formed on the transfer body,
    wherein the plurality of heating parts is arranged while being partitioned by a heat insulating plate.

7. The inkjet image forming apparatus according to claim 1, wherein the landing state includes a diameter of the ink droplet, and the hardware processor changes an amount of discharging the ink droplet from the inkjet head as the image forming condition.

8. The inkjet image forming apparatus according to claim 1, wherein
    the landing state includes a landing position of the ink droplet, and
    the hardware processor changes timing of discharging the ink droplet from the inkjet head as the image forming condition.

9. The inkjet image forming apparatus according to claim 1, further comprising
    a smoother that smooths an image forming surface on which the image is formed on the transfer body.

10. The inkjet image forming apparatus according to claim 1, wherein
    ink used for forming the image has an ultraviolet curable property that the ink is cured by being irradiated with an ultraviolet ray.

11. An image forming condition changing method comprising:
    forming an image on a transfer body by discharging an ink droplet from an inkjet head;
    detecting a landing state of the ink droplet that has been discharged and landed on the transfer body; and
    changing an image forming condition when the image is formed so that a detected landing state approaches a target landing state, and
    heating, by a heating part, a landing area of the ink droplet on the transfer body,
    wherein the detected landing state is a diameter of the ink droplet,
    the method further comprises changing heating temperature of the heating part as the image forming condition, and
    the heating part is arranged on a back surface side of the transfer body and has a structure in which a heater, an aluminum plate, and a porous material are sequentially laminated in that order from below.

* * * * *